United States Patent [19]

Douri

[11] 4,044,445
[45] Aug. 30, 1977

[54] APPARATUS FOR ATTACHING END STOPS TO FASTENER STRINGERS WITH A SAFETY STOP FUNCTION

[75] Inventor: Hisashi Douri, Kurobe, Japan

[73] Assignee: Yoshida Kogyo Kabushiki Kaisha, Japan

[21] Appl. No.: 629,527

[22] Filed: Nov. 6, 1975

[30] Foreign Application Priority Data

Nov. 15, 1974 Japan ............................ 49-132356

[51] Int. Cl.² ............................................. H01H 3/16
[52] U.S. Cl. .................................... 29/706; 29/408; 29/767; 192/134; 200/61.42
[58] Field of Search ............ 192/129 R, 129 A, 129 B, 192/130, 134, 138; 29/408, 409, 410, 428, 432, 207.5 ST, 207.5 R, 207.5 SL, 208 C; 425/154; 200/61.42; 100/53; 307/92

[56] References Cited

U.S. PATENT DOCUMENTS

| 1,658,151 | 2/1928 | Wyrfel | 192/130 |
| 3,487,182 | 10/1969 | Grundy | 192/134 X |
| 3,588,991 | 6/1971 | Maisenbacher | 29/408 |
| 3,866,004 | 7/1973 | Nawrocki | 192/134 X |
| 3,939,314 | 2/1976 | Loeser | 192/134 X |

FOREIGN PATENT DOCUMENTS 852,204   8/1952   Germany .............. 192/130

Primary Examiner—Francis S. Husar
Assistant Examiner—Mark Rosenbaum
Attorney, Agent, or Firm—Bucknam and Archer

[57] ABSTRACT

In the operation of punching a performed stop blank onto a pair of coupled fastener stringers placed over a stationary die, a sensor is provided which moves up and down over the die to sense mechanically the presence of any foreign matter such as the operator's fingers between the punch and die. The punch is permitted to descend fully onto the stringers on the die only after the sensor has completed its downward stroke. In the apparatus of the invention the up-and-down motion of the punch is effected as by an air cylinder via a lever, and the sensor is coupled to another lever which is spring loaded to follow the motion of the punch lever, in such a manner that the sensor travels faster than the punch. Limit switches are employed to prevent the full descent of the punch where necessary.

4 Claims, 6 Drawing Figures

APPARATUS FOR ATTACHING END STOPS TO FASTENER STRINGERS WITH A SAFETY STOP FUNCTION

BACKGROUND OF THE INVENTION

1. Field of the Invention

This invention relates generally to the production of slide fasteners, and more specifically to a method of and apparatus for attaching end stops to a fastener chain or a pair of coupled fastener stringers without danger of injury to the operator.

2. Prior Art

The invention has particular reference to the type of apparatus wherein end stops are punched onto fastener stringers which have been sewn onto articles such as trousers. Unlike the usual stop applying apparatus employed during the manufacture of slide fasteners, the apparatus of the above defined type requires large spacing between the reciprocating punch in its elevated position and the stationary die therebelow, because the operator must manipulate the fastener stringers already attached to desired articles. In the apparatus under consideration, therefore, the danger is imminent that the operator may permit descent of the punch while his fingers or other foreign matter is lying over the die. Undue attention on the part of the operator to avoid this danger, however, results in a significant decrease in the operating efficiency.

SUMMARY OF THE INVENTION

It is an object of this invention to provide a method of safely and efficiently attaching end stops to a fastener chain or stringers, without any possibility of bodily harm to the operator.

It is also an object of this invention to provide apparatus of simplified and compact construction for carrying the inventive method into effect.

According to the method of this invention, briefly summarized, there is provided a sensor movable up and down over a stationary die. After placement of a pair of fastener stringers on the die, the sensor is lowered toward the die to sense mechanically the presence of any foreign matter other than the stringers over the die. The punch carrying a stop blank thereunder is permitted to descend fully onto the stringers to attach the stop blank thereto only after the sensor has completed its downward stroke without encountering any foreign matter.

Thus, in event the operator has his fingers caught under the descending sensor, for example, the punch can be automatically prevented from the full descent onto the stringers over the die. The inventive method, moreover, affords sufficient spacing between the punch in its elevated position and the die for the operator to handle the stringers with ease. These results combine to realize higher operating efficiency.

In the apparatus for carrying out the above summarized method of the invention the punch has its holder coupled to one end of a first lever the other end of which is coupled to actuator means such as an air cylinder. The sensor is likewise coupled to one end of a second lever the other end of which is spring energized into engaging contact with the first lever so that the second lever may follow the motion of the first lever. The first and second levers are so constructed and arranged in relation to each other, however, that the sensor completes its downward stroke earlier than the punch, even though they start descending simultaneously. The failure of the sensor to complete the downward stroke is detected by detector means such as limit switches, which then cause the actuator means to prevent the subsequent full descent of the punch.

As may have been noted from the foregoing, the apparatus according to the invention permits the punch to start descending simultaneously with the sensor, to such a position as to cause no harm to foreign matter which lie over the die, and the punch goes down the remaining distance only after the sensor has completed its stroke. The desired safety stop function can therefore be performed without increasing the length of time for each operating cycle of the apparatus.

The novel features which are considered characteristic of this invention are set forth in particular in the appended claims. The invention itself, however, both as to its method and apparatus, as well as the additional objects and advantages thereof, will become apparent in the course of the following description of typical embodiments, which is to be read in connection with the accompanying drawings in which like reference characters refer to like parts throughout the several views.

DESCRIPTION OF THE PREFERRED METHOD EMBODIMENT

Figure 1A:
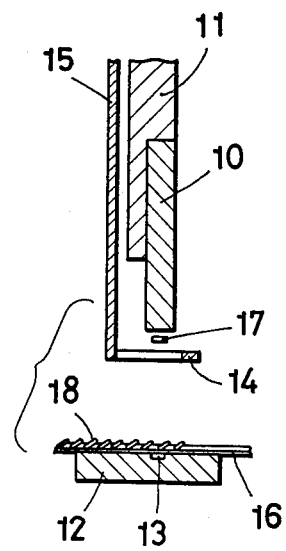
FIGS. 1A to 1D, inclusive, are schematic, fragmentary vertical sectional views explanatory of the operation of attaching an end stop to a pair of coupled fastener stringers according to the method of this invention.

The method of this invention will become apparent from a consideration of FIGS. 1A to 1D. In each of these drawings there are shown a reciprocating punch 10 carried by a punch holder 11, a stationary die 12 arranged under the punch and suitably recessed at 13, and a sensor 14 having a support portion 15 (hereinafter referred to as the sensor support) and arranged for up-and-down motion over the die.

For affixation of an end stop to a predetermined position on a pair of coupled fastener stringers or fastener chain 16 by the method of this invention, a blank strip 17 of metal is fed under the punch 10 while this punch and the sensor 14 are both held in their most elevated positions as shown in FIG. 1A. The fastener stringers 16 are placed over the die 12 so that the desired end of the interengaged rows of fastener elements 18 thereof may be located in precise register with the punch 10.

Figure 1B:
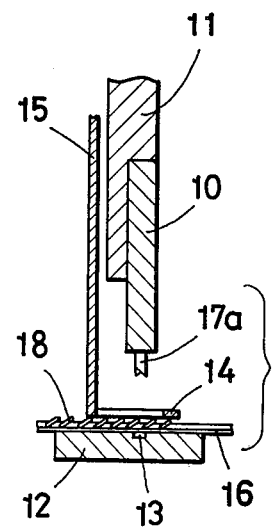

As illustrated in FIG. 1B the sensor 14 is then lowered onto the fastener stringers 16 over the die 12 prior to the punch 10. In the illustrated embodiment of the invention the sensor 14 is assumed to start descending simultaneously with the punch 10 but to travel at a significantly higher speed than the latter. As a consequence, the sensor 14 completes its downward stroke earlier than the punch 10 and reaches the position of FIG. 1B, where the sensor is lightly in touch with the fastener stringers 16 over the die 12.

In the meantime the blank strip 17 that has been fed under the punch 10 is severed to a suitable length and preformed into a stop blank 17a in the shape of an inverted U by any known or suitable means, with the preformed stop blank being carried under the punch. The above operation may be completed either before or approximately concurrently with the completion of the downward stroke by the sensor 14.

Figure 1C:
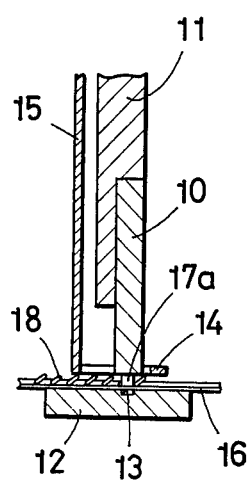

With reference to FIG. 1C the punch 10 descends fully onto the fastener stringers 16 over the die 12 only after the sensor 14 has reached the position of FIG. 1B. The punch is further forced against the stringers to drive the pair of legs of the stop blank 17a into and through the stringer tapes at the desired end of the rows of fastener elements 18 thereon. The stop blank 17a can be securely affixed to the stringers as its legs are subsequently clinched in the die recess 13 under pressure from the punch 10.

Figure 1D:
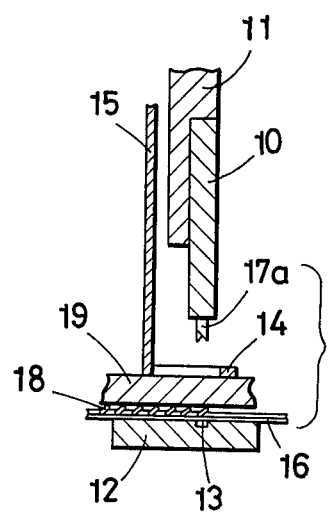

As depicted in FIG. 1D, however, the sensor 14 will be prevented from completing the downward stroke in event some foreign matter such as the operator's fingers intervenes as at 19 between the sensor 14 and the die 12 in addition to the fastener stringers 16. Thereupon the operation of the apparatus is to be suspended immediately or, alternatively, the punch 10 and sensor 14 may be automatically returned to their most elevated positions of FIG. 1A. In either case the punch is restrained from descending fully onto the die to attach the stop blank to the stringers lying thereover unless the sensor precedingly completes its downward stroke.

The preferred method embodiment set forth in the foregoing is open to a variety of modifications within the scope of this invention. For example, the descent of the punch 10, as well as the preforming of the blank strip 17 into the stop blank 17a, may be initiated following the full descent of the sensor 14 onto the fastener stringers 16 over the die 12.

DESCRIPTION OF THE PREFERRED APPARATUS EMBODIMENT

Figure 2:
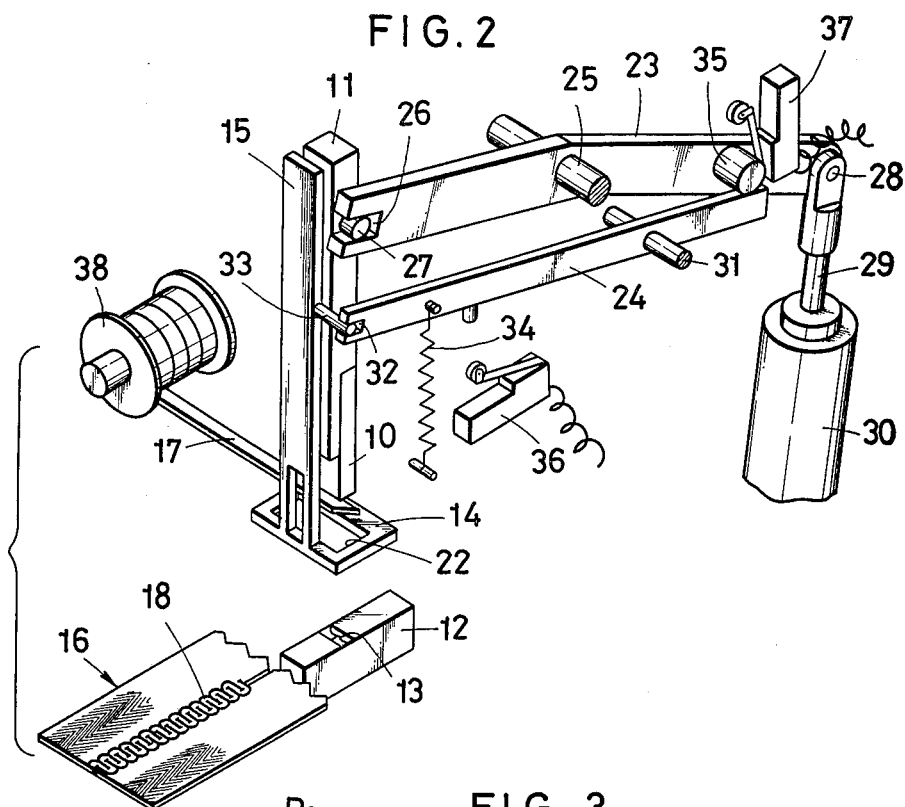
FIG. 2 is a perspective view showing the essential parts of the apparatus for carrying out the method of the invention.
Figure 3:
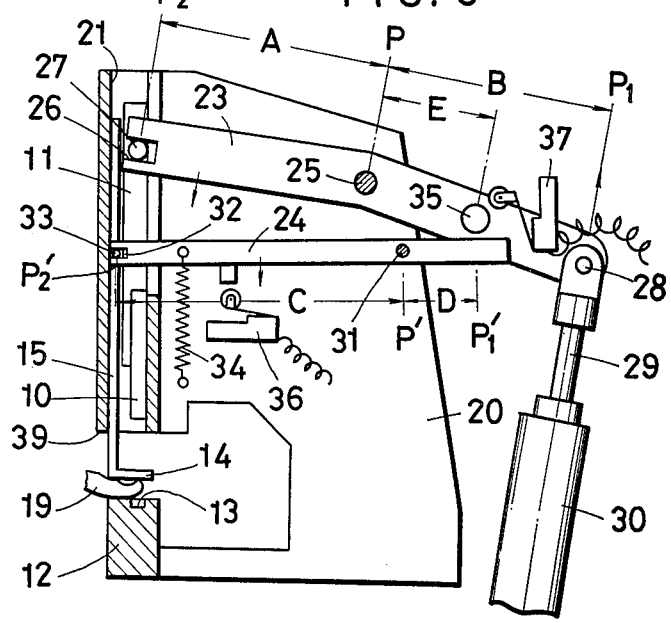
FIG. 3 is a side elevational view, partly in vertical section, of the apparatus of FIG. 2.

FIGS. 2 and 3 illustrate the apparatus believed to be of the optimum construction for carrying out the above described method of the invention. The apparatus includes a frame 20, FIG. 3, having a vertical guideway 21 over the stationary die 12. Slidably fitted in this guideway 21 are the punch holder 11 carrying the punch 10 at its bottom end and the sensor support 15 formed integral with, and extending upwardly from, the sensor 14. The punch holder 11 and sensor support 15 are movable up and down along the guideway 21 independently of each other.

It will be observed from FIG. 2 that the sensor 14 is in the form of a rectangular plate having an opening 22 to permit the punch 10 to pass with clearnace therethrough. The die 12 with its recess 13 is of course disposed in exact vertical register with the punch 10.

First and second levers are provided at 23 and 24 for imparting up-down motion to the punch holder 11 and sensor support 15 respectively. The first lever 23 is herein termed the punch lever, and the second lever 24 the sensor lever.

The punch lever 23 is pivotally mounted on a shaft or pin 25 located intermediate both ends thereof. The front end of this punch lever, which is shown directed to the left in FIGS. 2 and 3, is recessed or slotted at 26 to engage slidably a pin 27 projecting laterally from the punch holder 11. The rear end of the punch lever is pivotally coupled at 28 to the piston rod 29 of an air cylinder 30 which communicates with a suitable source of air under pressure via a solenoid valve, not shown.

The sensor lever 24 is arranged under the punch lever 23 and is likewise pivotally mounted on a shaft or pin 31 located intermediate both ends thereof. The front end of the sensor lever is also recessed or slotted at 32 to engage slidably a pin 33 projecting laterally from the sensor support 15. The rear end of the sensor lever is urged, as by a tension spring shown at 34, into engaging contact with a pin 35 mounted on the punch lever 23 adjacent its rear end. The sensor lever 24 is thus adapted to follow the swinging motion of the punch lever 23 to impart the desired up-and-down motion to the sensor 14 via the sensor support 15.

A first limit switch 36 is arranged under the front end portion of the sensor lever 24 so as to be activated thereby upon descent of the sensor 14 to a predetermined degree. A second limit switch 37 is arranged adjacent the pin 35 on the punch lever 23 so as to be activated thereby upon descent of the punch 10 to another predetermined degree. Shown at 38 in FIG. 2 is a reel from which the blank strip 17 is fed by indexed movement under the punch 10 while same is in its elevated position as shown.

With particular reference to FIG. 3 the punch and sensor levers 23 and 24 have their fulcrums located at P and P', their points of applications of forces at P1 and P1', and their points of exertion of pressures at P2 and P2', respectively. The capitals A and B represent the lever arms of the punch lever 23, and C and D represent the lever arms of the sensor lever 24. The relative positions of these points P, P1 and P2; P', P1' and P2', and the ratios of the lever arms A/B and the lever arms C/D, are so determined and correlated that the sensor 14 may complete its downward stroke earlier than the punch 10, even though they start descending simultaneously, as will more fully appear from the following description.

In the operation of this apparatus the foot pedal, not shown, may be depressed to open the unshown solenoid valve and hence to cause extension of the piston rod 29 of the air cylinder 30, as indicated by the arrow in FIG. 3. The punch lever 23 will then turn counterclockwise, as viewed in the drawing, about its fulcrum P located at the pin 25, thereby causing the punch 10 to descend with the punch holder 11.

Since the pin 35 adjacent the rear end of the punch lever 23 rises with the counterclockwise turn of the punch lever, the sensor lever 24 also turns counterclockwise about its fulcrum P' located at the pin 31. In this manner the sensor 14 with its support portion 15 commences the downward stroke simultaneously with the punch 10.

Let it now be assumed that the following relations are established in the arrangement of FIG. 3:

$$A:B = 1:1, \ C:D = 4:1, \text{ and } B:E = 2:1$$

where E is the distance between the pins 25 and 35, that is, the distance between the fulcrum P of the punch lever 23 and the point P1' of application of the force on the sensor lever 24. Also assume that the stroke of sensor 14 is 40 milimeters.

In order for the sensor 14 to complete the 40 millimeters downward stroke under the above conditions, the pin 35 or the point P1' of application of the force on the sensor lever 24 is required to rise 10 millimeters since $C:D = 4:1$ and hence $40 \div 4 = 10$. For this 10 millimeters rise of the pin 35, the piston rod 29 of the air cylinder 30 or the point P1 of application of the force on the punch lever 23 must rise 20 millimeters since $B:E = 2$ and hence $10 \times 2 = 20$. This means that the punch 10 is lowered 20 millimeters from its most elevated position when the sensor 14 completes the 40 millimeters downward stroke. The amplitude of the lever arm C of the sensor lever 24 at this juncture is therefore twice as much as the amplitude of the lever arm A of the punch lever 23 since $40 \div 20 = 2$.

As the punch 10 is lowered only 20 millimeters at the instant of the full descent of the sensor 14 as discussed above, the length between the most elevated position of the punch and the bottom end 39 of the guide way 21 may be made slightly greater than 20 millimeters. The first limit switch 36 may be so arranged as to be activated by the sensor lever 24 slightly before this moment, and the second limit switch 37 may be so arranged as to be activated by the punch lever 23 only slightly later.

Thus, in event the descending sensor 14 encounters some foreign matter 19 other than the fastener stringers 16 over the die 12, the first limit switch 36 will not be activated. Only the second limit switch 37 will be activated by the punch lever 23 to detect the descent of the punch 10. Although the electrical details are not specifically illustrated because of their conventional nature, it is assumed that the second limit switch 37 when thus activated causes the air cylinder 30 to retract its piston rod 29 via the unshown solenoid valve, with the consequent return of the punch 10 and sensor 14 to their most elevated positions. Alternatively, the entire operation of the apparatus may be immediately suspended.

When no foreign matter is present over the die so that the sensor 14 completes its downward stroke, the first and second limit switches 36 and 37 will be successively activated. In this case the air cylinder 30 is permitted to make continued extension of its piston rod 29 and hence to cause the punch 10 to descend fully onto the fastener stringers 16 over the die 12. The stop blank 17a can then be affixed to the fastener stringers in the manner previously set forth in connection with FIG. 1C.

It will have been appreciated that the apparatus according to this invention is well calculated to perform the safety stop function as taught by the method of the invention without any substantial decrease in the operating speed. The invention itself, however, is not to be restricted by the exact showing of the accompanying drawings or the description thereof, as numerous modifications will readily occur to those skilled in the art on the basis of this disclosure. For example, the punch lever may be actuated by a hydraulic cylinder instead of the air cylinder, or an electromagnetic clutch may be employed to control the motion of the lever. The limit switches may also be replaced by proximity switches or other detector means.

All these and other modifications or changes are intended in the foregoing disclosure, so that it is appropriate that the invention be construed broadly and in a manner consistent with the fair meaning or proper scope of the following claims.

What is claimed is:

1. In combination apparatus for attaching end stops to fastener stringers by means of a punch carried by a punch holder and arranged over a stationary die for up-and-down motion relative to same, and the combination of a sensor arranged over said die for up-and-down motion relative to same, a first lever pivotally supported intermediate both ends and coupled at one end to said punch holder, actuator means coupled to the other end of said first lever to impart up-and-down motion to said punch via said punch holder, a second lever pivotally supported intermediate both ends and coupled at one end to said sensor, spring means urging the other end of said second lever into engagement with said first lever whereby said second lever follows the motion of said first lever to impart up-and-down motion to said sensor, said first and second levers being so constructed and arranged in relation to each other that said sensor completes its downward stroke earlier than said punch, and detector means effective to cause said actuator means to prevent the full descent of said punch in event said sensor fails to complete the downward stroke because of the presence of some foreign matter other than the fastener stringers between itself and said die.

2. The apparatus of claim 1, wherein said sensor is in the form of a rectangular plate having an opening through which said punch passes upon full descent onto said die.

3. The apparatus of claim 2, wherein said sensor includes a support portion extending upwardly therefrom, said support portion being arranged in side-by-side relationship to said punch holder, and wherein said one end of said second lever is coupled to said sensor via said support portion.

4. The apparatus of claim 1, wherein said detector means comprises a first switch adapted to be activated upon descent of said sensor to a predetermined degree, and a second switch adapted to be activated upon descent of said punch to another predetermined degree.

* * * * *